United States Patent [19]

Shimano

[11] 4,445,396
[45] May 1, 1984

[54] HANDLEBAR FOR A BICYCLE

[75] Inventor: Keizo Shimano, Sakai, Japan

[73] Assignee: Shimano Industrial Company Limited, Osaka, Japan

[21] Appl. No.: 239,537

[22] Filed: Mar. 2, 1981

[30] Foreign Application Priority Data

Mar. 6, 1980 [JP] Japan .............................. 55-30114[U]

[51] Int. Cl.³ ............................................. B62K 21/12
[52] U.S. Cl. .................................. 74/551.1; 74/551.8; 74/551.9
[58] Field of Search ................. 74/551.1, 551.9, 551.8, 74/558; D12/178, 107, 111, 112, 114

[56] References Cited

FOREIGN PATENT DOCUMENTS 1646 10/1978 European Pat. Off. .
953453 12/1949 France .

Primary Examiner—Lawrence J. Staab
Assistant Examiner—Anthony W. Raskob, Jr.
Attorney, Agent, or Firm—Stevens, Davis, Miller & Mosher

[57] ABSTRACT

A handlebar for a bicycle, which comprises a bar body and attaching members each having a concave surface in cross section to fit the outer periphery of the bar body and being formed in a semiellipse-like shape in cross section, so that the attaching members are fixed to the outer periphery of the bar body along the rear side thereof in the forward moving direction of the bicycle.

5 Claims, 4 Drawing Figures

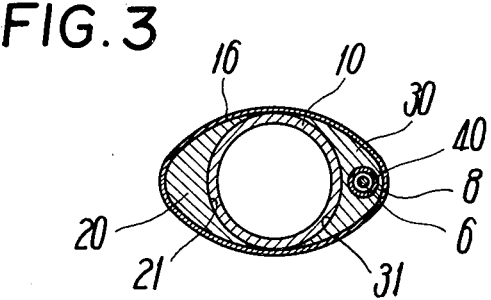
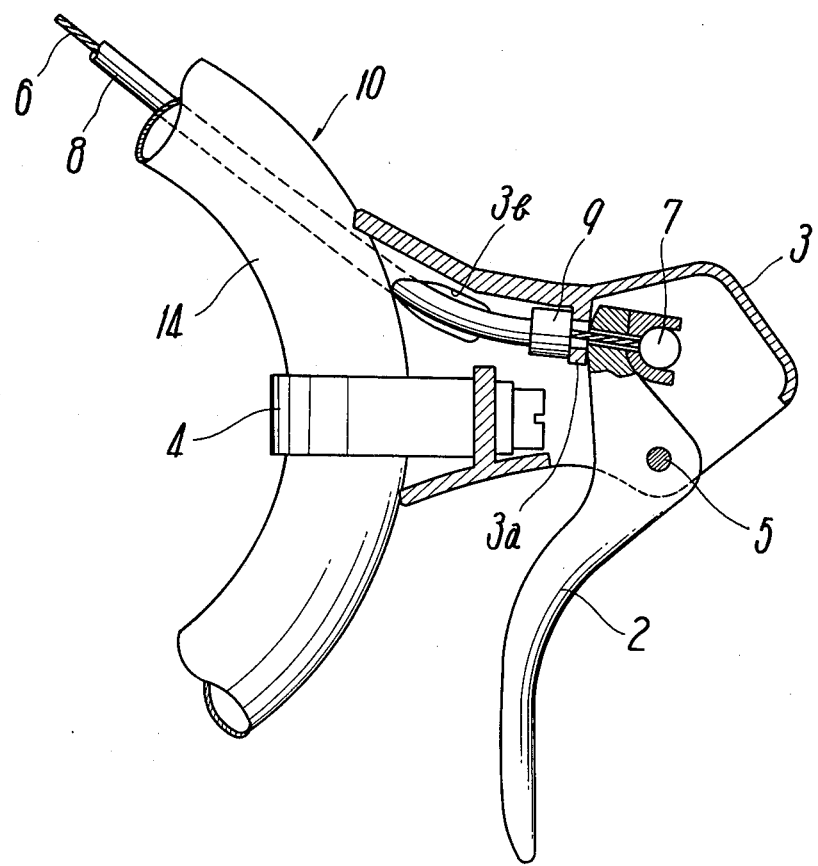

HANDLEBAR FOR A BICYCLE

FIELD OF THE INVENTION

This invention relates to handlebars for bicycles, which are mounted on a handle stem of the bicycle and are provided at both ends with brake controlling levers.

The handlebar of the invention is not specific to a form, but is applicable to any flat-type, drop-type and up-type handlebars.

BACKGROUND OF THE INVENTION

Generally, any type of handlebar for a bicycle is made from a pipe round in section, so that turbulent air flow occurs at the rear of the handlebar in the forward moving direction of the bicycle when running at high speed, causing air resistance to running. The handlebar carries at one end or often at both ends control levers mainly for the brakes, or for a derailleur. Control wires and other sheaths guiding the wires, are connected to the levers and extend therefrom along the bicycle frame, such as a top tube or head pipe, to brakes at the front and rear wheels or to a derailluer. The wires and outer sheaths, in the vicinity of the lever, are bent at a larger curvature and forwardly project from the handlebar in opposition to a large air resistance to the bicycle's running. This is not preferred, especially for a racing bicycle used in a road race, and also gives the bicycle a poor appearance.

The former problem concerning the sectional shape of the handlebar can be solved by making a handlebar with a streamlined section, but the handlebar is complex to machine and expensive to produce in comparison with that formed from a round pipe. The latter problem of projecting wires and outer sheaths can be solved by inserting the control wires into the bar body, but through-bores are necessary, reducing the strength of the bar body. Hence, both the aforesaid problems cannot be solved.

SUMMARY OF THE INVENTION

An object of the invention is to provide a handlebar for a bicycle, a bar body of which is formed having less air resistance without being made streamlined in section. Another object of the invention is to provide a hanldebar for a bicycle, which can provide control wires extending along the bar body from control levers mounted thereon without through-bores for inserting the control wires. A further object of the invention is to provide a handlebar for a bicycle, which can guide the control wires along the bar body without using conventional outer sheaths.

This invention is characterized in that a handlebar comprises a bar body and attaching members separate therefrom, the attaching members each having a concave surface of a circular arc cross section to fit the outer periphery of the bar body. The attaching members have a cross section semielliptical in shape and fixed onto the outer periphery of the bar body along at least the rear side among both sides of the bar body in the forward moving direction of the bicycle.

The attaching members each extend along the bar body from the mounting portion with the handle stem, to the vicinity of a mounting portion for the control lever at one end of the bar body. Contact of a concave surface of the attaching members throughout the whole length is made with the outer periphery of the bar body. Therefore, the bar body in combination with the attaching members is streamlined and has less air resistance while the bicycle is running.

The attaching members of the invention are provided from the mounting portion of the bar body for the handle stem toward both ends of the bar body, and fixed at the rear side thereof as foregoing.

Alternatively, a pair of first attaching members and a pair of second attaching members separate therefrom, may be fixed to the bar body along the rear side and the front side in the forward moving direction of the bicycle respectively. Hence, the bar body is formed having a substantially elliptic cross section, whereby air flow at the rear of the bar body is less tubulent.

The handlebar of the invention utilizes the attaching members constructed according to the foregoing to guide control wires from control levers along the bar body, so that this invention is further characterized in that the attaching members have insertion bores for the control wires respectively.

Consequently, there is no need for use of the conventional outer sheaths guiding the control wires and bending forwardly with larger curvatures. In other words, the attaching members serve as the outer sheaths. Hence, the handlebar of the invention can guide the control wires without increasing the number of parts and also overcome the problem of air resistance against the control wires and outer sheaths.

In addition, the aforesaid embodiment may use the outer sheaths without hindrance, in which the through-bore at each attaching member has a diameter slightly larger than an outer diameter of the outer sheath, permitting the outer sheaths to be inserted into the through-bores respectively.

The reason for using the outer sheaths as the above is that they are usually provided at the inner periphery with liners for smoothly guiding the wire, so that the through-bores including the outer sheaths need not be designed to make the inner periphery smooth. As a result, the attaching members are easily machined.

On the other hand, the attaching members, when formed of a slick material, such as synthetic resin, provide the smooth guidance of wire. However, the attaching members fixed along the bar body are preferably flexible to fit the bar body even when bent and be easily gripped by a driver. Therefore, for smoothly guiding the control wires it is preferable to combine the through-bores with the outer sheaths respectivley.

Furthermore, the attaching members are usually fixed to the bar body with an adhesive, but may be fixedly wound by a handlebar tape when used to wind the bar body for easy gripping. In addition, the bar body of the invention is preferably round in section for easy machining, but is not limited to such shape.

These and other objects of the invention will become more apparent in the detailed description and examples which follow.

BRIEF DESCRIPTION OF THE DRAWINGS

FIG. 3 is an enlarged sectional view taken on the line III—III in FIG. 2, and FIG. 4 is a view of a mounting portion of a control lever on the handlebar in FIG. 2, including a partially sectional side view of a bracket member carrying the control lever.

DETAILED DESCRIPTION OF THE INVENTION

Figure 1:
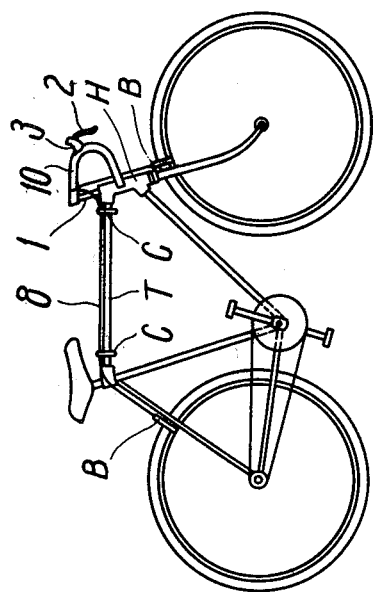
FIG. 1 is a schematic side view of a bicycle using a handlebar of the invention.
Figure 2:
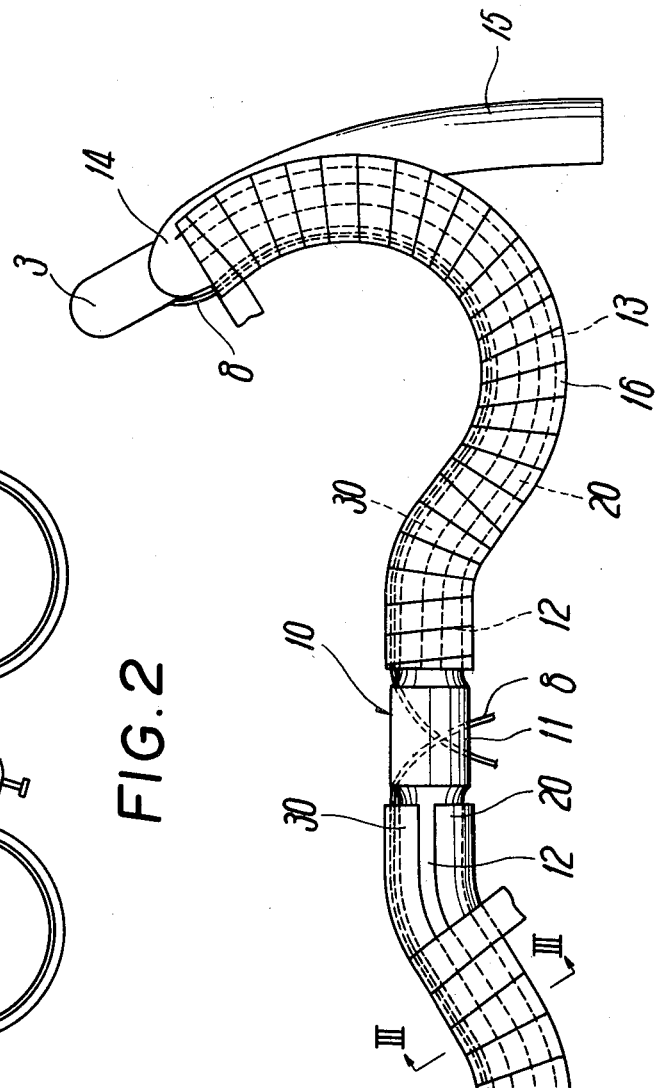
FIG. 2 is a plan view of an embodiment of a handlebar of the invention.

A drop-type handlebar shown in FIGS. 1 and 2 has a bar body 10 having at its central portion a mounting portion 11 through which the bar body 10 is mounted on a handle stem 1 at a bicycle in FIG. 1 and comprising; straight portions 12 in continuation of the mounting portion 11 and horizontally extending therefrom; first bent portions 13 bending forwardly from one end of straight portions 12; second bent portions 14 bending downwardly and rearwardly from the utmost ends of first bent portions 13; and extending portions 15 extending rearwardly from the lower rear ends of second bent portions 14; the second bent portions 14, as shown in FIG. 4, being provided at the front portions with brake controlling levers 2 through bracket members 3 respectively, the bracket members 3 being fixed to the second bent portions 14 by means of bands 4 respectively. The levers 2 are pivotally supported to the bracket members 3 through lever shafts 5 and carry through retainers 7 one end of control wires 6 connected to brakes B shown in FIG. 1 respectively.

In FIG. 4, reference numeral 8 is an outer sheath guiding the wire 6. THe outer sheath 8 is supported through a holder 9 to stopper 3a provided within the bracket member 3, the control wire 6 and outer heath 8 exiting the bracket member 3 through a bore 3b.

The bar body 10 of the handlebar of the invention is formed of a round pipe. A pair of first attaching members 20 to be hereinafter described are formed separately from the bar body 10 and fixed in contact therewith as shown in FIGS. 2 and 3.

Each attaching member 20, as shown in FIG. 3, has a concave surface 21 to fit the outer periphery of bar body 10, and is semielliptical in cross section, extending from near one end of mounting portion 11 towards one end of bar body 10, and is fixed to the outer periphery of bar body 10 along the rear side thereof in the forward moving direction of the bicycle.

Also, each attaching member 20 contacts at its concave surface 21 with the rear side of bar body 10 and is fixed therewith an adhesive or a handlebar tape 16 would onto the bar body 10.

The handlebar tape 16 shown in FIG. 2 is terminated at an outer end of each attaching member 20, but actually wound until the utmost end of each extending portion 15.

Now, FIGS. 2 and 3 show a pair of second attaching members 30 separate from first attaching members 20.

The second attaching members 30 each have a concave surface 31 to fit the outer surface of bar body 10 and each have a section and length the same as the first attaching members 20. As seen from FIGS. 2 and 3, the second attaching members 30 are fixed to the bar body 10 along the front side thereof the same as the first attaching members 20, in which the handlebar tape 16, when in use, binds the second attaching members 30 together with the first attaching members 20.

When attached with the second attaching members 30 together with the first attaching members 20, the bar body 10 is made elliptic in cross section, thereby more effectively restricting the air resistance.

The first and second attaching members 20 and 30 may be similar in cross section as shown in FIG. 3, but it is preferable that the extension of the rear end portion of each first attaching member 20 is made smaller in curvature than the extension of the front end portion of each second attaching member 30, so that the handlebar becomes reasonably streamlined in cross section.

In the aforesaid construction, both the first and second attaching members 20 and 30 are made from synthetic resin so as to be flexible, and either of them, the second attaching members 30, as shown in FIG. 3, are provided with through-bores 40 for control wires 6 respectively.

The reason for forming the attaching members 20 and 30 of a flexible material, is to make them easily attached along the bar body 10 and easily gripped by a driver. Hence, if the bar body 10 is straight or has grips separate therefrom, any material is available from the attaching members 20 and 30.

The through bores 40 are used for guiding the control wires 6 along the bar body 10 from the levers 2, so that the wires 6 together with the outer sheaths need not project forwardly from the handlebar at the larger curvature.

In the drawings, a conventional outer sheath 8 is used, which exits the side wall of bracket 3 and is inserted together with the wire 6 into the bore 40, the bore 40 of course having an inner diameter larger than an outer diameter of outer sheath 8.

As seen from the above, the outer sheaths 8, even when used, and control wires 6, can be guided along the bar body 10 through the bores 40 at the second attaching members 30, so that the outer sheaths 8 and control wires 6 need not project extensively from the bar body 10, thereby reducing the air resistance and giving the handlebar a good appearance.

In addition, each outer sheath 8 and each control wire 6 are inserted into the bore 40 from an opening thereof at the lever 2 side exiting an opening of bore 40 at the mounting portion 11 side, and extending along a top tube T and head pipe H to the brakes B at the front and rear wheels while being fixed at several places by clips C.

Alternatively, the second attaching members 30 in the aforesaid embodiment may be omitted. The through bores 40 may be provided at the first attaching members 20.

In a case where one control lever 2 is provided at one end of bar body 10, the through bore 40 may be provided at the attaching member 20 or 30 only at a side of the bar body 10 carrying the one lever 2.

The outer sheaths 8 may alternatively be omitted, in which each wire 6 is guided through through-bore 40 provided at the attaching member 20 or 30. In this instance, it is preferable that each bore 40 is constructed to easily slide the wire 6, or a selected material is used for the attaching member 20 or 30.

Furthermore, when the attaching member 20 or 30 serves as the outer sheath, a separate outer sheath is supported to an end of attaching member 20 or 30 at the mounting portion 11 side, so that the wire 6 guided through the through-bore 40 is relayed to the outer sheath.

While an embodiment of the invention has been shown and described, the invention is not limited to the specific construction thereof, which is merely exemplary in the specification rather than defined.

What is claimed is:

1. A bicycle handlebar for mounting on a handle stem of a bicycle receiving at an end a control lever, said handlebar comprising a bar body which has at its central portion a mounting portion through which said handlebar is mounted on said handle stem, and a pair of attaching members each having a concave surface of a circular arc cross section to fit an outer periphery of said bar body and each being formed to have a semielliptical cross section, each of said attaching members extending from said mounting portion along said bar body toward an end thereof, and being fixed to the outer periphery of said bar body along a rear side thereof in a forward moving direction of the bicycle, so that said concave surface thereof contacts with the rear side, at least one of said attaching members having an insertion bore extending along its entire longitudinal extent for housing a control wire extending from said control lever and along said bar body.

2. A handlebar for a bicycle according to claim 1, wherein a pair of first attaching members and a pair of second attaching members corresponding thereto, are provided, said first attaching members being fixed to said bar body along the rear side thereof, said second attaching members being fixed to said bar body along a front side thereof.

3. A handlebar for a bicycle according to claim 1, wherein said insertion bore includes an outer sheath guiding said control wire.

4. A handlebar for a bicycle according to claim 1 wherein each of said attaching members is fixed to said bar body by a handlebar tape wound on the outer periphery of said bar body.

5. A bicycle handlebar for mounting on a handle stem of a bicycle receiving at an end a control lever, said handlebar comprising a bar body which has at its central portion a mounting portion through which said handlebar is mounted on said handle stem, and a first and second pair of attaching members each of said attaching members having a concave surface of a circular arc cross section to fit an outer periphery of said bar body and each being formed to have a semielliptical cross section, each of said attaching members extending from said mounting portion along said bar body toward an end thereof, said first pair of attaching members being fixed to the outer periphery of said bar body along a rear side thereof in a forward moving direction of the bicycle, so that said concave surface thereof contacts with the rear side, said second pair of attaching members being fixed to the outer periphery of said bar body along a front side thereof in a forward moving direction of the bicycle so that the concave surfaces thereof contacts with the front side, at least one of said attaching members having an insertion bore extending along its entire longitudinal extent for housing a control wire extending from said control lever and along said bar body.

* * * * *